Dec. 27, 1949          J. O. YEIDA          2,492,675
CONTROL FOR TEMPERATURE CHANGING MECHANISM
Filed June 16, 1943                3 Sheets-Sheet 1
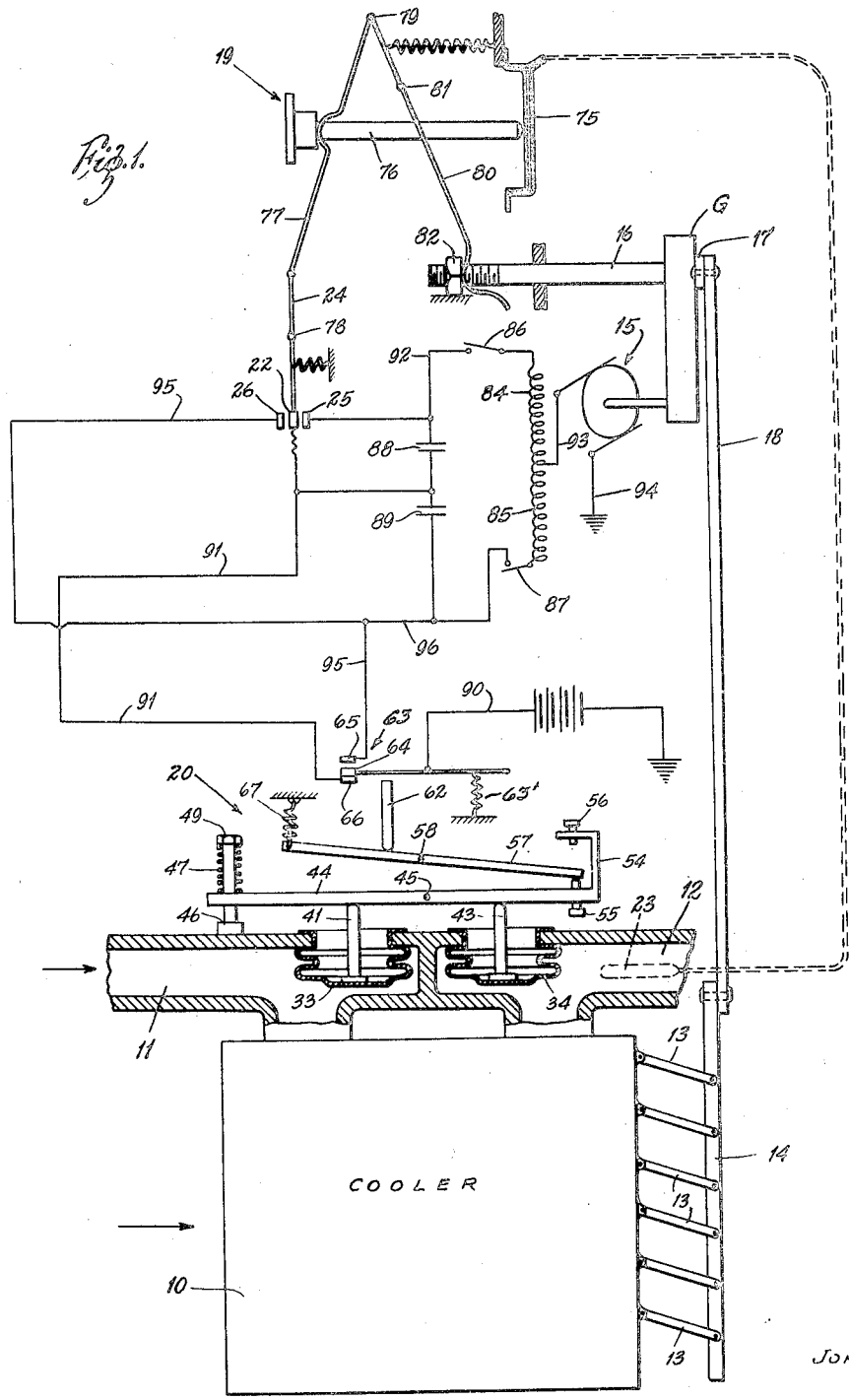
INVENTOR
JOHN O. YEIDA
BY Kingsland, Rogers & Ezell
ATTORNEYS.

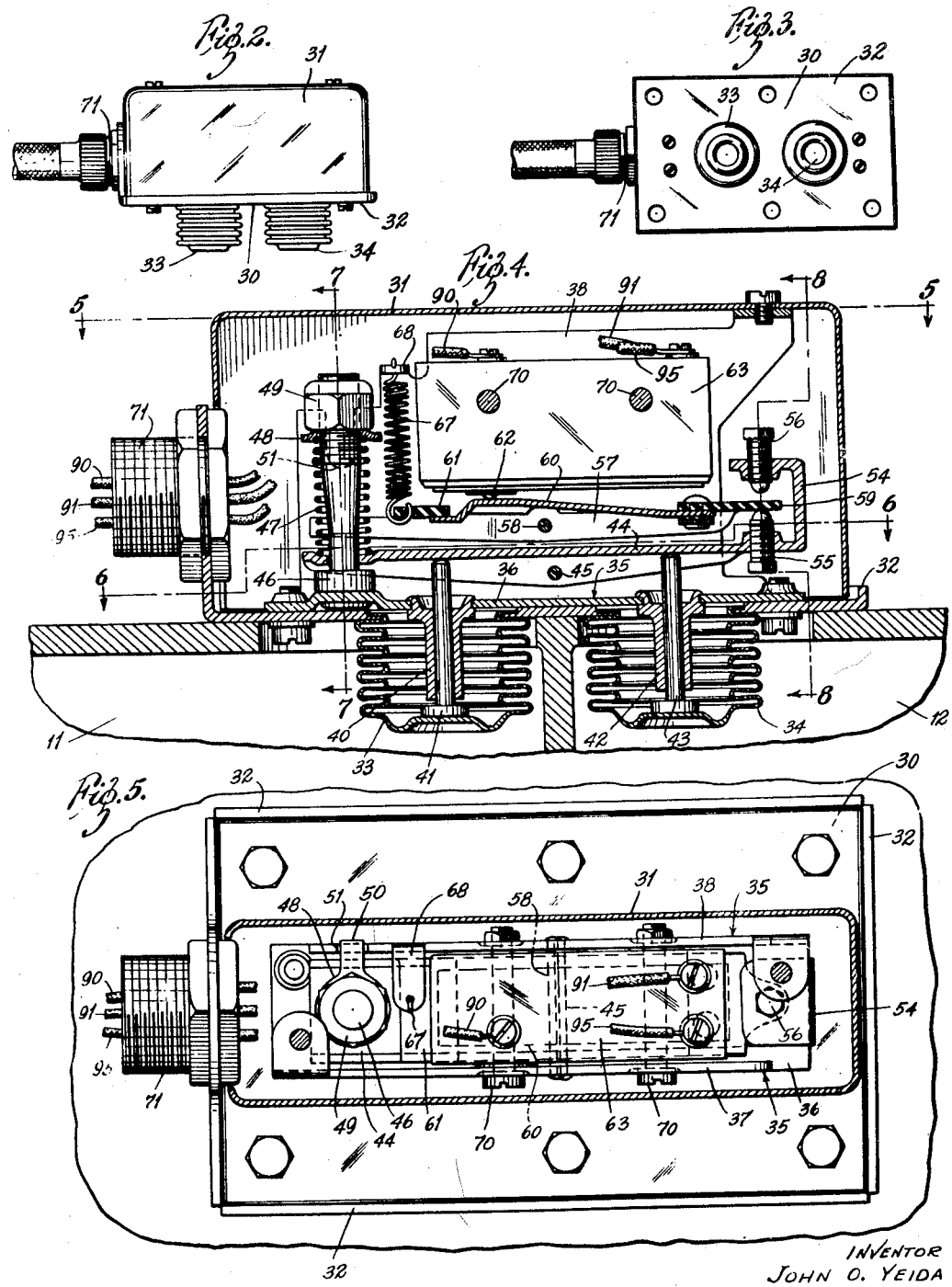
Dec. 27, 1949     J. O. YEIDA     2,492,675
CONTROL FOR TEMPERATURE CHANGING MECHANISM
Filed June 16, 1943     3 Sheets-Sheet 2
INVENTOR
JOHN O. YEIDA
By Kingsland, Rogers & Hall
ATTORNEYS Dec. 27, 1949  J. O. YEIDA  2,492,675
CONTROL FOR TEMPERATURE CHANGING MECHANISM
Filed June 16, 1943  3 Sheets-Sheet 3

INVENTOR
JOHN O. YEIDA
BY Kingsland, Rogers Ezell
ATTORNEYS

Patented Dec. 27, 1949

2,492,675

UNITED STATES PATENT OFFICE 2,492,675

CONTROL FOR TEMPERATURE CHANGING MECHANISMS

John O. Yeida, Herculaneum, Mo., assignor, by mesne assignments, to Missouri Automatic Control Corporation, a corporation of Missouri Application June 16, 1943, Serial No. 491,004

6 Claims. (Cl. 257—2)

The present invention relates to a control for temperature changing mechanism. It comprises a system for the control of flow of a fluid through a temperature changing device, and embodies a unit having two pressure responsive elements subjected to two different pressure conditions, a switch or like control, and means to receive movements of both pressure responsive elements to produce movement for actuating the switch that is the resultant of the two pressure responsive elements.

An object of the invention is to provide a control of a fluid subject to critical change of flow characteristics upon change in temperature beyond a predetermined temperature value, which control responds to the change in flow characteristics to effect a temperature condition of the fluid within the limits of said predetermined temperature value, and consequently to provide in the fluid the flow characteristics desired.

An object of the invention is to provide a system and mechanism that will promptly remedy certain physical changes in a fluid caused by an excessively low temperature of the coolant. More particularly, an object is to provide a system and mechanism that will prevent excessive waxing and promptly remedy any waxing of oil in an oil cooler. A further object is to provide a system of temperature control of oil in a system embodying an adjustable oil cooler, in which the adjustable cooling capacity of the cooler is subject to temperature control of the oil therein, and is subject to overall control by means operating as a function of rate of cooling of the oil, which means in the preferred embodiment comprises pressure-responsive means actuated by excessive pressure in the oil caused by resistance to flow resulting from a deposit of wax in the cooler.

A further object is to provide a system and mechanism which are independent of the particular pressures applied, but are responsive to a differential between inlet and outlet pressures of the cooler.

A further object is to provide a control having a switch that normally assumes one position, and an actuating element adapted to displace the switch to the other position, and spring or analogous means capable of holding the actuating element in position displacing the switch but incapable of initially displacing the same.

In the drawings:

Fig. 1 is an assembly view and wiring diagram of the control on a cooler;

Fig. 2 is a side elevation of the control mechanism itself;

Fig. 3 is a bottom view of the control mechanism as shown in Fig. 2;

Fig. 4 is a longitudinal medial section through the control;

Fig. 5 is a longitudinal section on line 5—5 through the top of Fig. 4;

Figure 6:
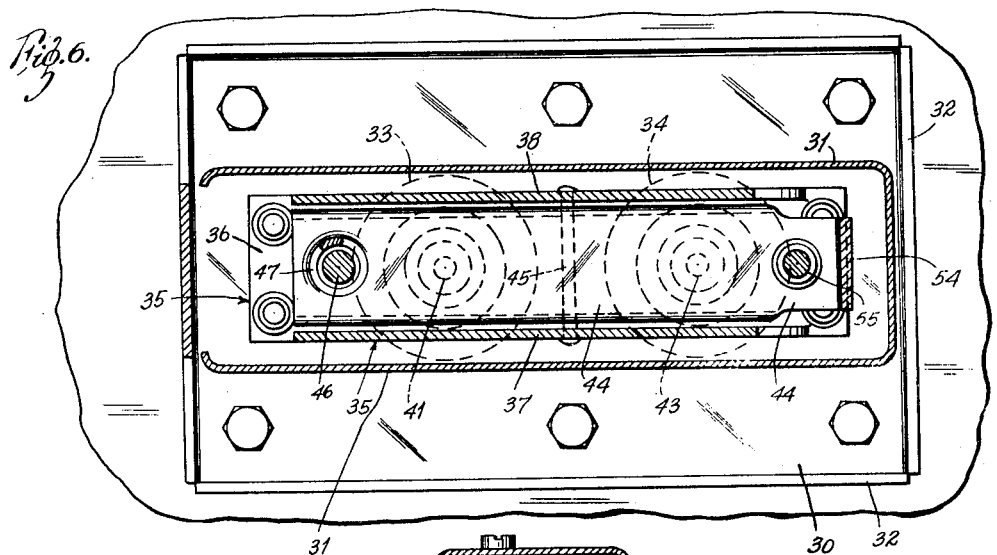
Fig. 6 is a longitudinal section on line 6—6 taken across the lower part of Fig. 4.

In Fig. 1, an oil cooler 10 is shown as having an inlet oil passage 11 receiving oil from the motor or the like, and an outlet passage 12 returning the oil to the reservoir. The oil cooler receives air from the left hand side in Fig. 1, as shown by the arrow. On the opposite side of the oil cooler are a series of shutters 13 connected by a common rod 14 so that they may be opened or closed to adjust the flow of cooling air through the cooler. The rod 14 is actuated by a high torque actuator 15 here shown as a reversible electric motor. This motor 15 operates through a gear box G to drive a shaft 16 having thereon a crank 17, connected by a link 18 to the rod 14 on the shutters.

The system includes a temperature control generally indicated at 19 and a pressure control generally indicated at 20.

The temperature control 19 has a bulb 23 located in the outlet pipe of the oil cooler to be responsive to the temperatures of the oil at the outlet. The temperature control 19 is of the follow-up type such as that shown in the application John O. Yeida, Serial No. 440,193, filed April 23, 1942, now Patent No. 2,395,604, dated February 26, 1946, which is the basis of the diagrammatic showing in Fig. 1. In any case a temperature change at the bulb 23 causes change in the size of an expansion chamber to actuate a switch lever 24 having a contact 22, in one direction or in the other. This switch, when shifted upon increase of heat at the bulb, engages its contact 22 with a contact 25, and when closed in the other direction upon decrease in temperature at the bulb, engages its contact 22 with a contact 26. As will appear, a circuit is made through the contact 25 to effect opening of the shutters on the cooler, and a circuit through the contact 26 to effect closing of the shutters.

As will further appear, when motor 15 operates, the shutters are moved, and at the same time a follow-up mechanism is operated to reopen the switch in the control 19 by moving the contact 22 to neutral position between the contacts 25 and 26, in the manner such as is produced in the application aforesaid.

This will cause the shutters to operate in the selected direction and stop in a position corresponding to the particular temperature. If the temperature continues to change in the same direction at the bulb 23, an additional operation of the switch in the control 19 will produce an additional stage in the operating of the shutters 13. If the temperature reverses at the bulb 23, the other circuit through the control 19 will be closed and the shutters will be caused to operate in an opposite direction until their position accords with the new temperature.

Figure 7:
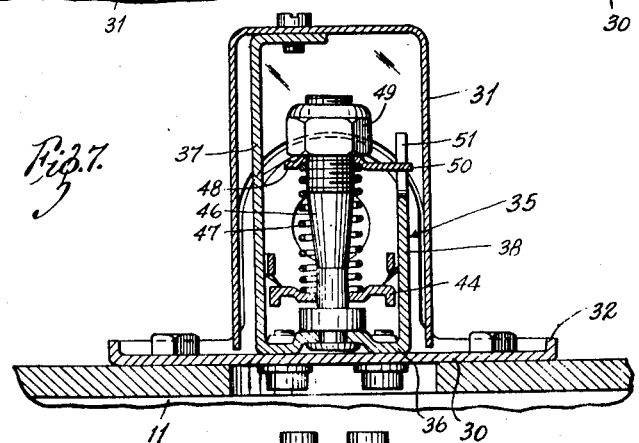
Fig. 7 is a transverse sectional view taken on the line 7—7 to the left of Fig. 4; and, Fig. 8 is a transverse sectional view taken on the broken line 8—8 at the right of Fig. 4.
Figure 8:
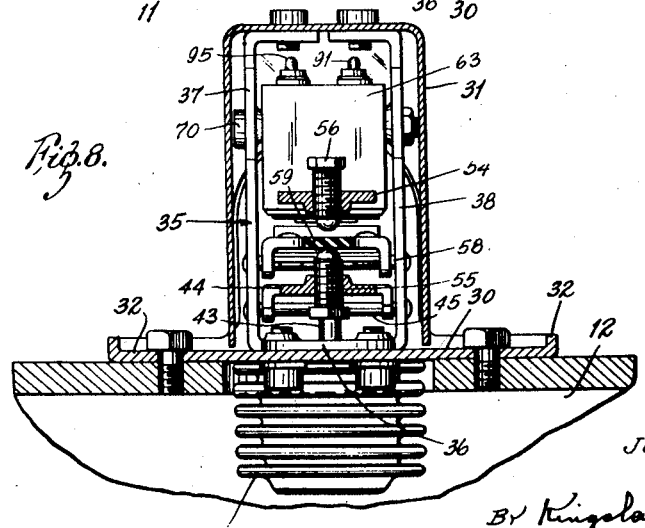

The differential pressure control 20 is shown in more detail in Figs. 2-8 inclusive. It includes a bottom plate 30, over which is secured a cover 31. The bottom plate has flanges 32 that receive bolts for attaching the unit to the inlet and outlet elements of the cooler 10.

Extending through suitable openings in the bottom plate 30 are an inlet bellows 33 disposed in the inlet portion 11 and an outlet bellows 34 projecting into the outlet portion 12. These bellows are sealed to prevent any fluid flow from the passages into which they project.

Secured above the bottom plate 32 is a channel shaped member 35 having a bottom portion 36 and two side portions 37 and 38. The bottom portion 36 has a sleeve 40 projecting in the bellows 33 to receive and guide a headed stud 41 adapted to abut the bottom of the bellows 33 and to be displaced thereby. A similar sleeve 42 projects from the bottom plate 36 into the bellows 34 and receives a similar headed stud 43 to be actuated by the bellows 34.

A first or primary lever 44 is pivoted on a spindle 45 mounted between the sides 37 and 38 of the channel member 35. The pivot 45 is equidistant from the studs 41 and 43 so that the two bellows 33 and 34 act equally and oppositely on the lever.

At one end of the lever 44, here designated as the inner end, the lever surrounds a stud 46 secured to the bottom 36 of the channel 35 and upstanding therefrom. A compression spring 47 surrounds the stud 46 to act downwardly upon the inner end of the lever 44, the upper end of the spring 47 being restrained by a washer 48 adjustably held by a nut 49 threaded to the upper end of the stud 46. The washer 48 has a dog 50 (Fig. 5). This dog 50 is restrained by a vertical slot 51 in the side 38 of the channel member 35. Consequently, adjustment of the nut 49 to vary the force of the spring 47 does not twist the spring.

The free end of the lever 44 is bent in the portion 54 to provide space to receive two opposite, adjustable screws 55 and 56 which are displaced upon displacement of the lever.

A flanged secondary lever 57 pivoted on a spindle 58 extending between the side walls 37 and 38 of the channel member 35, has a portion 59 extending transversely between the screws 55 and 56. This transverse portion has secured to it a resilient tongue 60 comprising the actuating end of the secondary lever. The outer end of the tongue 60 may be brought into abutment with an additional transverse portion 61 of the lever 57 to limit movement of the tongue 60 upwardly but to permit free displacement of the tongue downwardly from the portion 61. The tongue 60 operates as an overrun spring, but normally is in contact with portion 61.

The secondary lever 57, by means of its tongue 60, engages the actuating button 62 of a switch 63, which is of any of the familiar constructions so that it may be actuated to one position when the button 62 is moved upwardly and is actuated to the other position when the lever 57 is withdrawn from the button 62. In the particular arrangement here illustrated the switch 63 closes a center contact 64 with a contact 65 when the button 62 is pressed inwardly and breaks with the said contact 65 but makes with a contact 66 when the button 62 is released. This switch 63 is of a familiar snap action type in which the normal position is one in which the contact 64 is normally yieldably engaged with the contact 66, which is shifted from that position to the other with a snap action, but which always applies a return force tending to engage the said contacts 64 and 66.

A coil spring 67 is suspended between the portion 61 of the secondary lever 57, and an ear 68 extending across from the upper edge of the side 38 of the channel member 35. This spring of itself does not possess force to actuate the button 62 inwardly against the internal spring of the switch that urges the button outwardly, but it does possess enough force to hold the button inwardly after it has been forced inwardly by the secondary lever 57. Consequently, in Fig. 4, the spring 67 is holding the button 62 in, and will do so until the primary lever 44 is shifted further to cause the adjustable screw 55 to displace the lever 57. This last displacement will withdraw the secondary lever from the button 62 and the latter will shift the switch 63. Thereafter, with the button 62 out, if the primary lever 44 starts shifting in the other direction, the screw 55 will withdraw from the secondary lever. In such case, although the spring 67 maintains the secondary lever in contact with the button 62, it will not move the same inward, as its force is inadequate. The secondary lever will remain thus until the other screw 56 is brought against it and moves it to force the button 62 inward.

It is evident that the foregoing arrangement makes the screws 55 and 56 determine the switch differential of the control 20. Thus, if it acts at 23 p. s. i. differential of the bellows on increase, the switch may act at 18 p. s. i. differential on decrease.

The switch 63 is secured by bolts 70 between the walls 37 and 38. Its connections are brought to a suitable connector plug 71 conveniently disposed on the member 35.

As shown diagrammatically in Fig. 1, the temperature unit 19 includes the bulb 23 and an expansion chamber 75. As appears in greater detail in the copending application referred to, the chamber 75 actuates the stud 76 that produces movement of the lever 77. The lever 77 is pivoted at one of its ends to the switch lever 24, which in turn is pivoted at 78 to the housing. At its other end the lever 77 is pivoted at 79 to a lever 80 which is pivoted at 81 to the housing, and which overhangs a non-rotatable nut 82 reciprocated by threads on the shaft 16.

When the bulb 23 heats, the expansion chamber 75 enlarges against a return spring (not shown here) displacing the stud 76 and causing the lever 77 to pivot clockwise about pivot 79; and this, in turn, causes the lever 24 to pivot about 78 to close contacts 22 and 25. As will appear, this energizes a circuit to cause the motor 15 to open the shutters, which in turn, moves the nut 82 to effect movement of the lever 80 counterclockwise about its fixed pivot 81, which in turn pivots the lever 77 counterclockwise about the engagement with the adjustable sleeve on the stud 76. Finally, this last movement pivots the switch lever 24 clockwise about its pivot 78 to return the contact 22 to neutral position, withdrawing the contact 22 from the contact 25.

Cooling of the bulb 23 produces a reverse cycle the same in function as the foregoing.

The motor 15 is shown as series wound, with an opening winding 84 and a closing winding 85. Limit switches 86 and 87 are provided, the former being disposed in the circuit to the opening winding 84 and the latter in the circuit to the closing winding 85. These limit switches are operated in one of the conventional ways to open their respective circuits when the shutters reach maximum open and maximum closed positions.

Two condenser units 88 and 89 may be employed to control sparking upon opening and closing of the motor circuits.

The connections between the several units are as follows; assuming a grounded system.

A power line 90 is connected to the movable contact 64 of the differential pressure control 20. This contact 64 is normally closed with the contact 66, which is connected by a line 91 to the movable contact 22 of the temperature control 17. The contact 25 of the temperature control is connected by a line 92, through the limit switch 86, to the winding 84, thence by a line 93 into the rotor, and by a line 94 to ground.

The other, high pressure, contact 65 of the differential pressure control 20, is connected by a line 95 directly with the closing circuit of the temperature control through the line 96, the limit switch 87, to the closing winding 85 of the motor 15, and thence through the rotor to ground.

The condenser units 88 and 89 are connected to the line 91 and to the lines 92 and 96, respectively.

*Operation*

As heretofore noted, one of the particular applications of the present system and mechanism is in connection with oil coolers on aircraft. In such assemblies an oil reservoir is provided to supply oil to the engine. The oil is drawn off from the engine by scavenging pumps and is forced through the cooler from the inlet 11 to the outlet 12. Between the outlet 12 and the oil reservoir the oil may be forced through other accessories and then into the reservoir. These accessories apply a somewhat varying back pressure against the scavenging pump.

The cooler which is here shown as the conventional air flow type, receives outside air which passes over radiating means in the cooler to reduce the temperature of the oil therein. In order to preserve a desired constant temperature of the oil going back to the reservoir, the temperature control 19 adjusts the shutters to determine the amount of cooling air flowing through the cooler.

However, under certain conditions typified by high altitude flying, the air going through the cooler may be abnormally low in temperature. Such excessively cold air cools the oil so rapidly that waxing occurs. It will be seen that if the oil next to the outer surfaces of the coils of the cooler is cooled too rapidly it will wax, although the inner oil continues to flow through the tubes and to pass into the outlet 12 at temperatures demanding an open position of the shutters. This waxing condition if unchecked will insulate and clog the cooler. Thus, the temperature control of the cooler not only is unable to prevent or remedy this waxing condition, but would further aggravate the condition by opening the cooler shutters. When waxing occurs in the present system the pressure control 20 will shift its switch and cause the shutters to be closed regardless of the temperature condition. The shutters will remain closed until the critical condition of pressures has been relieved by the heat of the incoming oil causing the wax to melt whereupon the operation of the cooler shutters will be returned to control of the temperature control 19.

With the foregoing example of an application of this mechanism in view, the detailed operation will be clear. Generally speaking, the differential pressure control 20 will be in a position wherein the contacts 64 and 66 are closed, this condition existing whenever the differential pressure between the inlet and the outlet sides of the cooler is below the critical value for which the differential pressure control is set.

The temperature control 19 may be in a neutral position in which the contact 22 is between the contacts 25 and 26. When, however, the temperature at the bulb 23 changes, the switch blade 24 will be moved. If the temperature increases at bulb 23 indicating excess temperature of the oil, the expansion chamber 75 will move the stud 76, causing the lever 77 to pivot about the pivot 79, and permitting the switch lever 24 to move clockwise about the pivot 78 to close the contacts 22 and 25 to establish the circuit through the opening winding of the motor.

The aforementioned circuit starts from the power line 90 through the contacts 64 and 66, the line 91, contacts 22 and 25, line 92, through the limit switch 86, through the opening winding 84, the line 93, the rotor and the line 94, to ground. This produces rotation of the motor in a direction to operate the shaft 16, the crank 17, and the links 18 and 14 to open the shutters.

As the motor thus rotates the shaft 16, the latter pulls the nut 82 toward the right in Fig. 1, causing the lever 80 to pivot counterclockwise about the pivot 81. Such movement of the lever 80 displaces the pivot 79 to cause the lever 77 to pivot counterclockwise about its engagement with the sleeve on the stud 76. This, in turn, pivots the switch lever 24 clockwise to break the motor circuit by moving the contact 22 to an intermediate position.

If the temperature of the bulb increases further, the foregoing cycle will be repeated, it being noted that the follow-up mechanism produces a position of the shutters 13 for each temperature at the bulb.

The closing circuit for the motor 15 is similarly established. If the bulb 23 cools, the chamber 75 contracts and the stud 76 pivots the lever 77 counterclockwise about the pivot 79 to close the contact 22 with the contact 26. This brings power from the line 91 through the contacts 22 and 26 to the lines 95 and 96, through the limit switch 87, through the closing winding 85 of the motor, and thence to ground. The motor then rotates the shaft 16 to reverse the crank 17, lower the links 18 and 14, and close the shutters 13, but at the same time the nut 82 is moved to the left in Fig. 1 so that after a predetermined number of revolutions, it opens the contacts again.

The temperature control 19 is normally sufficient to operate the oil cooler. However, when the coolant temperature becomes excessively low or when for any other reason the pressure differential between the inlet and the outlet becomes excessive, the differential pressure control 20 is brought into operation.

It will be seen that the operation of the differential pressure control is determined by the resultant of the forces acting upon the lever 44. One of these forces is that of the spring 47 which may, for present purposes, be assumed to be constant and of some value determined by the setting of the nut 49. The two bellows 33 and 34 apply varying pressures to the lever 44, the bellows 33 opposing the forces of the spring 47, and the bellows 34 augmenting the forces of the spring 47. Thus, to shift the lever 44 clockwise, the torque caused by the bellows 33 must exceed the torque of the spring 47 and that of the bellows 34.

If the bellows 34 were not present, then the spring 37 would determine the inlet pressure at which the switch would be shifted. If, for example, it is assumed that pressures above 23 p. s. i. in the inlet indicate the existence of waxing, the spring 47 could be set so that 23 p. s. i. pressure on the bellows 33 would shift the lever to cause operation of the switch.

However, such an arrangement is not wholly complete, as it does not take care of variations in outlet pressures that may occur for reasons not connected with the cooler. The waxing manifests itself by excessive pressure drop between the inlet and outlet, rather than by variation in pressure at the inlet. Hence for applications subject to variation in pressures outside the cooler itself, it is highly desirable to provide a means responsive to pressure drop across the critical part of the system, which in this application is that across the cooler.

To this end the second bellows 34 is provided, and is connected in opposition to the bellows 33. During any normal cooling operation, variations in inlet and outlet pressures are reflected on both bellows. Thus, if the spring 47 is set to cause shifting of the switch when inlet pressure is 23 p. s. i. and outlet is zero, this same setting will effect operation whenever inlet pressure exceeds outlet by that amount, regardless of variations in actual pressures. If outlet pressure goes to 3 p. s. i. for reasons extraneous to the cooler, then the bellows 33 cannot shift the switch until inlet pressure exceeds 26 p. s. i. These changes will not interfere with temperature control of the cooler, provided the resultant of all of them does not exceed the differential pressure for which the control is set.

Thus, only when the selected pressure differential is exceeded between the inlet and the outlet of the control 20, is the lever 44 shifted. Fig. 4 shows the switch at a mid point of the return movement, since the button 62 is in and the screw 55 is in contact with the lever 60. This return movement is completed by further displacement of the screw 55 by the lever 44 to pivot the secondary lever 57 against the spring 67 to release the button 62, to the position indicated diagrammatically in Fig. 1.

Hence, the movement of the switch upon increase in differential pressure begins with the control as shown in Fig. 4, except for the fact that an additional movement of the lever has permitted the button 62 to open. The reverse movement occasioned by the increase in differential pressure first withdraws the screw 55 from the secondary lever 57. Since the spring 67 cannot overcome the force of the internal switch spring 63' when the button is out, the secondary lever 57 will not move until the lever 44 has brought the other screw 56 against the lever 57 and has produced a positive displacement which ultimately moves the button 62 in. This lost motion provides a differential in the pressure for actuating the switch 63 inwardly from the pressure for actuating the same outwardly. Using the earlier illustration, a differential pressure of about 23 p. s. i. will move the switch button 62 in, but the differential pressure will have to drop to a lower figure such as 18 p. s. i. before the button 62 will be shifted out. This differential insures the time required for oil to warm up and overcome the waxing condition, and also prevents chattering of the mechanism.

Referring to Fig. 1, it will be seen that when the button 62 is out, the differential pressure not being exceeded, the contacts 64 and 66 are closed. When, however, the button 62 is moved inwardly, the contacts 64 will break from the contact 66 and will make with the contact 65.

It will be observed that both of the circuits operated by the temperature control 19 depend for power upon closure of the line 91 with the power line 90, and hence breaking the contacts 64 and 66 cuts the temperature control out, whatever its condition. However, closure of the contacts 64 and 65 introduces power to the line 95, to shunt the temperature control 19 and energize the closing winding 85 whether or not the temperature control 19 so provides, and regardless of whether the temperature control would otherwise have the opening circuit of the motor energized or not. When this is done by the differential pressure switch, it causes the motor to move the shutters to closed position until the limit switch 87 opens the circuit, or until the control 20 by satisfaction of its pressure differential setting, puts the line 91 back in circuit. Furthermore, the operation of the shutters to closed position operates the follow-up mechanism of the control 19 normally to preset that control in condition to start a reopening as soon as the pressure control 20 returns to normal position. In any case, however, as soon as the pressure control does return to normal position, the operation of the motor and the position of the shutters will be dependent upon the condition of the temperature control 19. Usually, since the pressure control is an overriding mechanism, it will be called into operation only when the temperature control is either in a neutral position or in a position for operating the opening winding of the motor.

It will be seen that the particular differential pressure at which the control 20 operates is determined by the setting of the spring 47. The distance from the studs 41 and 43 to the pivot 45 is the same so that these two bellows are balanced. The internal switch differential of the control 20 may be varied by adjusting the screws 55 and 56 individually.

The control system as set forth provides a normal temperature control for the cooler with an overriding pressure control, and more particularly an overriding pressure control that is responsive to the difference in the pressures across the cooler.

It is obvious that this mechanism is responsive to rate of heat transfer from the oil to the cooler, as when the external temperature falls to such a low value at which heat is drawn from the oil at the internal surfaces of the coils more rapidly than the excess heat from the oil inward from the walls can be transferred toward them, and this low value is below the waxing temperature of the oil, waxing will occur, although the total excess heat in the entire body of oil in the cooler, if distributed, might maintain the oil above waxing temperature.

The operation described has been related to control of oil cooling, and more particularly, to control of oil cooling to prevent excessive waxing and to promptly remedy any waxing. This is an especial objective of the present invention. However, it will be seen that the system is of broader application, and may be applied wherever it is desired to have a pressure or pressure differential control device, particularly as an overriding control over some primary control. It is applicable to any system in which the rate of heat transfer of a medium being subjected to heat transfer, produces a change in resistance to flow.

What is claimed is:

1. In a mechanism of the kind described, an oil cooler control having an inlet and an outlet and means to adjust the amount of cooling to take place between the inlet and the outlet, one pressure responsive means movable upon increase and decrease of pressure and disposed in the inlet, another similar pressure responsive means disposed in the outlet, a primary lever pivoted between the two pressure responsive means and adapted to be displaced upon movement of the pressure responsive means in response to increases of pressure, a spring acting upon the primary lever to oppose one pressure responsive means upon increase of pressure thereon, said spring acting to augment the effect of increase of pressure on the second pressure responsive means, means to adjust the force of the spring upon the primary lever thereby to adjust the differential in pressure between the two pressure responsive means at which the primary lever is to be in equilibrium or displaced, a secondary lever adapted to be engaged by the first and displaced thereby, a switch adapted to be operated by the secondary lever, and means connecting the switch to the cooling capacity control means to cause the same to reduce its cooling capacity when the switch is operated by excess of inlet pressure over outlet pressure above the differential determined by the spring.

2. In a mechanism of the kind described, a base, a pair of collapsible pressure responsive means projecting from the base, each having a stud displaced upon movement of its respective pressure responsive means in response to changes in pressure, a lever extending across the ends of the studs to be abutted thereby but not connected thereto, a pivot for the lever between the studs, a spring acting on the lever in opposition to only one of the pressure responsive means, a pair of oppositely facing, adjustable abutments at one end of the lever, a second lever, one end of which extends between the abutments, a switch having an actuating member normally extended toward the second lever, and a light spring for urging the second lever towards the actuating member.

3. In a control for use with an oil cooler having an inlet and an outlet, and wherein there may be a pressure drop from the inlet to the outlet, together with an adjuster for varying the cooling effect of the cooler and a reversible motor having forward and reverse connections for moving the adjuster toward cold and warm positions, the combination of a temperature-responsive switch mechanism including a temperature-responsive element and a switch blade movable oppositely thereby, a first and a second fixed contact engageable by the blade, a warm circuit through the first contact for connection with the reverse connections of the motor, and adapted to be closed by engagement of the blade with the first contact, a cold circuit through the second contact for connection with the forward connections of the motor, and adapted to be closed by engagement of the switch blade with the second contact, means operated by movement of the motor in either direction to shift the switch blade away from its respective contact, to neutral position, pressure-responsive means having a pressure-responsive element adapted for disposition in the inlet and one in the outlet, mechanism operated by both elements to be moved in a first direction when the pressure difference exceeds a predetermined value, and in the opposite direction when said difference is below said value, a switch operated to a first position when the mechanism is operated in its first direction, and to a second switch position when the mechanism is operated in its second direction, said switch being adapted to close a circuit to the reverse connections when in its second position, and said cold circuit passing through said last-named switch and closed only when said switch is in its first position.

4. In a control for use with an oil cooler having an inlet and an outlet, and wherein there may be a pressure drop from the inlet to the outlet, together with an adjuster for varying the cooling effect of the cooler and a reversible motor having forward and reverse connections for moving the adjuster toward cold and warm positions, the combination of a temperature-responsive switch having a blade moved in response to temperature changes in the medium being cooled, contact means comprising a first contact and additional contact means comprising a second and a third contact selectively engageable by the first contact, one of said contact means being on the blade, a pressure-responsive means, and a pressure switch operated thereby, said pressure-responsive means being adapted to move the pressure switch to first position when the pressure differential between the inlet and the outlet is below a predetermined value, and adapted to move the pressure switch to a second position when the pressure differential is above the predetermined value, a contact on the pressure switch for each position, connections between the temperature and pressure-responsive switches and the motor connections for operating the motor in a forward direction only when the temperature-responsive means demands cooling and the pressure-responsive switch is in first position, connections between the temperature-responsive means and the motor connections for operating the motor in a reverse direction when the temperature-responsive means demands heating, connections between the pressure-responsive switch and the motor connections for operating the motor in a reverse direction when the pressure-responsive switch is in second position wherein said switch at the same time breaks the connections for forward movement of the motor, and means operated by the motor for positioning the contact means of the temperature-responsive means in opposition to movement thereof produced by the temperature-responsive means, whereby the temperature-responsive switch is opened by said motor after predetermined operation thereof.

5. In a mechanism of the kind described for use with a fluid cooler having an inlet and an outlet, a first pressure-responsive means disposed to respond to pressure in the inlet, second pressure-responsive means disposed to respond to pressure in the outlet, a first lever adapted to receive movements produced by both pressure-responsive means, said lever being pivoted between them whereby they act oppositely on it, a spring acting upon the lever in aid of only one pressure-responsive means and in opposition to the other, a switch normally urged into a first position but yieldable to a second, the force urging the switch from second toward first position being less than the force resisting its movement from first toward second position, a second lever between the switch and the first lever, a lost motion connection between the two levers whereby the first moves the second in one direction at a different position of the first than the position at which it moves the second in the other direction, a spring urging the second lever in a direction to displace the switch to second position, the spring producing a force on the switch, when the switch is in first position, insufficient to move it to second position, but producing a greater force, when the switch is in second position than its return force urging it toward first position.

6. In a system of the kind described, a fluid cooler, reversible, electrically operated means to vary the cooling capacity of the cooler, means movable in response to the pressure forcing the fluid through the cooler, said means including a switch operated to a first position when the pressure is below a predetermined value and operated to a second position when the pressure is above a predetermined value, a circuit for operating the varying means to increase the cooling effect, a circuit for operating the varying means to reduce the cooling effect, a temperature control responsive to temperature of the fluid, said temperature control including a switch operated in a first direction upon increase in temperature, and operated in a reverse direction upon decrease in temperature, a power connection leading to the pressure switch, and through that switch in first position to the temperature switch, the increasing circuit for the varying means leading to the increase side of the temperature switch, and the decreasing circuit for the varying means leading to the decrease side of the temperature switch, whereby said temperature switch may selectively close said circuits when the pressure switch is in first position, and a connection from the pressure switch in second position to one of said varying means circuits, whereby when the pressure switch shifts to second position it cuts the temperature switch out of control, and establishes its circuit to the varying means.

JOHN O. YEIDA.

REFERENCES CITED

The following references are of record in the file of this patent:

UNITED STATES PATENTS

| Number | Name | Date |
| --- | --- | --- |
| 1,371,242 | Hopwood | Mar. 15, 1921 |
| 1,459,218 | Knaak | June 19, 1923 |
| 1,835,307 | Johnson | Dec. 8, 1931 |
| 1,954,903 | Walker | Apr. 7, 1934 |
| 1,962,676 | Albright | June 12, 1934 |
| 2,136,964 | Birkigt | Nov. 15, 1938 |
| 2,151,238 | Shaw | Mar. 21, 1939 |
| 2,239,438 | Cockrell | Apr. 22, 1941 |
| 2,275,576 | Ware | Mar. 10, 1942 |
| 2,279,285 | Worth | Apr. 7, 1942 |
| 2,280,959 | Kronmiller | Apr. 28, 1942 |
| 2,288,877 | Andersen | July 7, 1942 |
| 2,301,665 | Dykeman | Nov. 10, 1942 |
| 2,314,937 | Hannon | Mar. 30, 1943 |
| 2,333,066 | Yeida | Oct. 26, 1943 |
| 2,348,212 | Gill | May 9, 1944 |
| 2,354,364 | Chapman | July 25, 1944 |
| 2,354,371 | Gill | July 25, 1944 |
| 2,365,223 | Silverstein | Dec. 19, 1944 |

FOREIGN PATENTS

| Number | Country | Date |
| --- | --- | --- |
| 232,309 | Great Britain | Apr. 14, 1925 |
| 466,286 | Great Britain | May 26, 1937 |
| 538,182 | Great Britain | July 24, 1941 |
| 806,182 | France | Sept. 21, 1936 |